(12) United States Patent
Nomura et al.

(10) Patent No.: US 10,576,736 B2
(45) Date of Patent: Mar. 3, 2020

(54) HEAD VOLTAGE CORRECTING METHOD FOR INKJET PRINTING APPARATUS, AND AN APPARATUS USING SAME

(71) Applicant: SCREEN HOLDINGS CO., LTD., Kyoto (JP)

(72) Inventors: Seiya Nomura, Kyoto (JP); Asuka Muramatsu, Kyoto (JP); Tomoyasu Okushima, Kyoto (JP); Kunio Muraji, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

(21) Appl. No.: 16/115,341

(22) Filed: Aug. 28, 2018

(65) Prior Publication Data

US 2019/0091998 A1 Mar. 28, 2019

(30) Foreign Application Priority Data

Sep. 28, 2017 (JP) ................. 2017-188392

(51) Int. Cl.
*B41J 2/045* (2006.01)
*B41J 2/21* (2006.01)
*G06K 15/02* (2006.01)
*B41J 29/393* (2006.01)

(52) U.S. Cl.
CPC ......... *B41J 2/04516* (2013.01); *B41J 2/0459* (2013.01); *B41J 2/04506* (2013.01); *B41J 2/04581* (2013.01); *B41J 2/04586* (2013.01); *B41J 2/2146* (2013.01); *G06K 15/027* (2013.01); *B41J 2029/3935* (2013.01)

(58) Field of Classification Search
CPC .. B41J 2/04516; B41J 2/2146; B41J 2/04581; B41J 2/04506; B41J 2/0459; B41J 2/04586; B41J 2029/3935; G06K 15/027
See application file for complete search history.

(56) References Cited

U.S. PATENT DOCUMENTS

2004/0145616 A1* 7/2004 Takahashi ............ B41J 2/04526
347/14

FOREIGN PATENT DOCUMENTS

JP 2016-002662 A 1/2016

* cited by examiner

*Primary Examiner* — Bradley W Thies
(74) *Attorney, Agent, or Firm* — McDermott Will & Emery LLP

(57) ABSTRACT

A head voltage correcting method for inkjet printing apparatus which perform printing by dispensing ink droplets from a head to a printing medium. The method includes the following steps:
a step of printing testing charts; a step of acquiring images of the testing charts; a step of determining presence or absence of satellite droplets for each drive voltage; a step of obtaining distances between the main droplets and the satellite droplets for each drive voltage; a step of obtaining a distance reference drive voltage from a relationship of the distances for each drive voltage and a distance threshold; a step of obtaining ink droplet sizes for each drive voltage; a step of obtaining a size reference drive voltage; and a step of comparing the distance reference drive voltage and the size reference drive voltage, and making correction by adopting a larger one as the reference voltage.

19 Claims, 9 Drawing Sheets

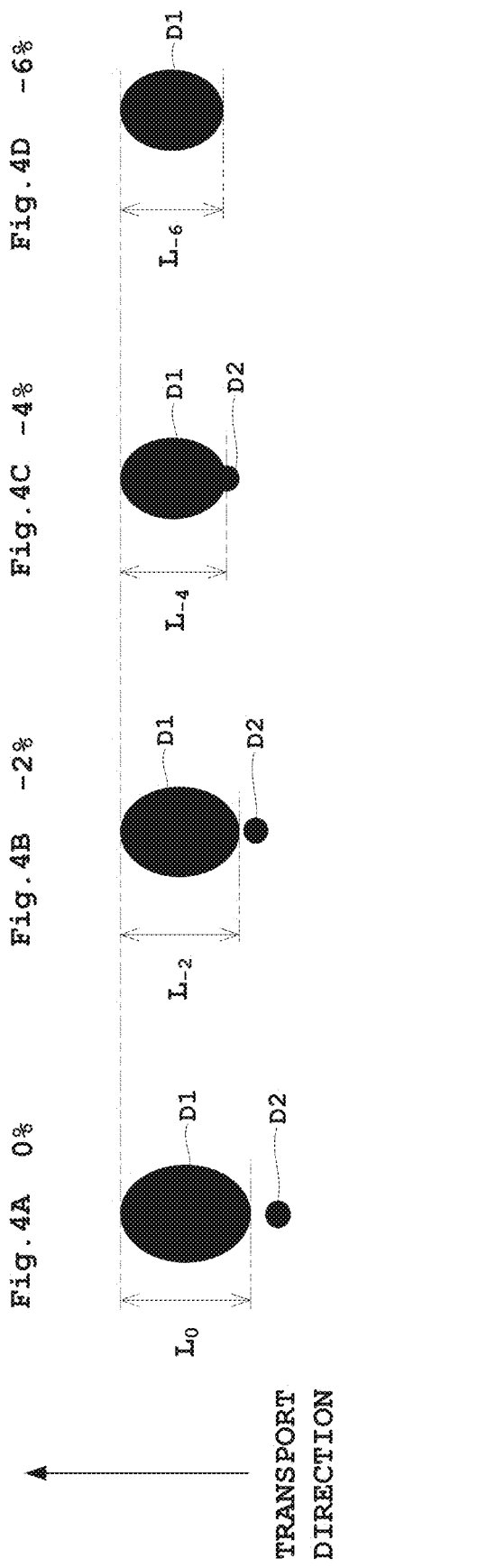

HEAD VOLTAGE CORRECTING METHOD FOR INKJET PRINTING APPARATUS, AND AN APPARATUS USING SAME

BACKGROUND OF THE INVENTION

(1) Field of the Invention

This invention relates to a head voltage correcting method for inkjet printing apparatus which perform printing on a printing medium by dispensing ink droplets thereto, and to an apparatus using the same.

(2) Description of the Related Art

An inkjet printing apparatus performs printing by dispensing ink droplets from heads to a printing medium. Since there are an individual difference from one head to another and a question of print quality, adjust-went is made at the time of manufacture to be capable of dispensing ink droplets in a predetermined density level which satisfies the specifications, and a voltage used at that time is set as reference voltage. Then, at the time of printing, the heads are given a drive voltage shifted from the reference voltage according to the density of print data.

However, despite whatever adjustment is made in advance, when the heads are installed on the apparatus, a defective dispensation of ink droplets may occur due to electrical characteristics of the board which drives the heads or slight displacements of the heads. With the defective dispensation in this case, the ink droplets may be in the form of main droplets and satellite droplets following the main droplets. Print quality will deteriorate when excessive distances occur between the main droplets and satellite droplets.

Then, a conventional head voltage correcting method for inkjet printing apparatus is executed as follows. Test charts are first printed on printing paper, and the testing charts are read to correct a reference voltage. Specifically, droplet images including main droplets and satellite droplets are acquired, the lengths of the droplet images are obtained, and differences between these lengths and the length of an ideal droplet image are determined. Then the reference voltage is corrected to reduce the differences (see Japanese Unexamined Patent Publication No. 2016-2662, for example).

However, the conventional example with such construction has the following problems.

Since the satellite droplets are minute in size, the conventional method cannot accurately distinguish between the main droplets and satellite droplets when the scanner used has low resolution. This poses a problem that, unless a relatively expensive scanner having high resolution is used, it is impossible to measure accurately distances from the main droplets to the satellite droplets, thereby failing to improve the accuracy of voltage correction.

Further, since the correction is made in such a way that the satellite droplets disappear or the satellite droplets are placed as close to the main droplets as possible, there is a possibility that the main droplets become too small for the density of the ink droplets to satisfy a specified level.

SUMMARY OF THE INVENTION

This invention has been made having regard to the state of the art noted above, and its object is to provide a head voltage correcting method for inkjet printing apparatus, and an apparatus using the same, which can improve the accuracy of voltage correction, even with use of a scanner of relatively low resolution, by extracting characteristic points of satellite droplets based on a luminance distribution of testing chart images, and can dispense ink droplets with density satisfying a specified level by taking the size of ink droplets into consideration.

To fulfill the above object, this invention provides the following construction.

This invention provides a head voltage correcting method for inkjet printing apparatus which perform printing by dispensing ink droplets from a head to a printing medium. The method comprises the steps of printing a testing chart corresponding to each different drive voltage by applying, to the head, drive voltages shifted at predetermined steps from a reference voltage for dispensing the ink droplets with predetermined density; acquiring a testing chart image for each testing chart by reading the testing chart; determining presence or absence of satellite droplets for each drive voltage, with regard to each testing chart image, based on a luminance distribution of main droplets and satellite droplets; obtaining distances between the main droplets and the satellite droplets for each drive voltage based on the luminance distribution, from the testing chart image for the drive voltage providing the satellite droplets; obtaining a distance reference drive voltage as a drive voltage satisfying a distance threshold, from a relationship of the distances for each drive voltage and the distance threshold which is a maximum of such distances between the main droplets and the satellite droplets that are, in the acquiring step, short enough to regard each pair of the main droplets and the satellite droplets as one ink droplet; obtaining ink droplet sizes for each drive voltage, with regard to each testing chart image, based on the luminance distribution of the main droplets and the satellite droplets; obtaining a size reference drive voltage as a drive voltage satisfying a size threshold, from a relationship of the sizes for each drive voltage and the size threshold which is an area providing a specified density; and comparing the distance reference drive voltage and the size reference drive voltage, and making correction by adopting a larger one as the reference voltage.

According to this invention, presence or absence of satellite droplets is determined for each different drive voltage, with regard to each testing chart image, based on a luminance distribution. Distances between the main droplets and the satellite droplets are obtained for each drive voltage from the testing chart for the drive voltage providing the satellite droplets. A distance reference drive voltage satisfying a distance threshold is obtained from a relationship of the distances for each drive voltage and the distance threshold. Further, ink droplet sizes are obtained for each drive voltage, with regard to the testing chart for each different drive voltage, based on a luminance distribution. A size reference drive voltage satisfying a size threshold is obtained from a relationship of the sizes for each drive voltage and the size threshold. Then, the distance reference drive voltage and the size reference drive voltage are compared, and the original reference voltage is replaced with the larger one. Since the distances of satellite droplets are obtained from characteristic points of the satellite droplets extracted based on the luminance distribution of the testing chart images, the accuracy of voltage correction can be improved even with a scanning device of relatively low resolution. Further, since the original reference voltage is replaced with the larger of the distance reference drive voltage and the size reference drive voltage, the reference voltage will become a drive voltage which satisfies both the distance threshold and size threshold. It is therefore possible to satisfy a specified density of ink droplets without lowering print quality.

In this invention, it is preferred that the step of determining presence or absence of satellite droplets is executed to determine presence or absence of satellite droplets, with regard to each test charge image, by extracting characteristic points of the satellite droplets based on the luminance distribution of the main droplets and the satellite droplets; and the step of obtaining distances is executed to obtain the distances between the main droplets and the satellite droplets for each drive voltage based on the characteristic points, from the testing chart image for the drive voltage providing the satellite droplets.

Since the distances between the main droplets and the satellite droplets are determined based on the characteristic points, presence or absence of satellite droplets and the distances between the main droplets and the satellite droplets can be obtained with high accuracy even from the testing chart images of low resolution.

In this invention, it is preferred that the step of determining presence or absence of satellite droplets is executed to obtain variation points in the luminance distribution of the testing chart image, and determine that satellite droplets are present when at least three variation points are found.

Variation points in the luminance distribution occur in front and rear portions of the main droplets and in front portions of the satellite droplets. It is therefore possible to determine presence of the satellite droplets only by counting the number of variation points.

In this invention, it is preferred that, when at least three variation points are found, a length between a second one and a third one of the variation points in order from downstream in a transport direction is determined to represent the distances.

By determining the length between the second one and third one of the variation points in order from downstream to represent the distances between the main droplets and the satellite droplets, the distances between the main droplets and the satellite droplets can be obtained almost accurately even with the scanning device of relatively low resolution.

In this invention, it is preferred that the step of obtaining the distance reference drive voltage is executed to determine to be the distance reference drive voltage a voltage value corresponding to an intersection of an approximate expression which approximates the distances for each drive voltage and a straight line of the distance threshold.

By obtaining an approximate expression which approximates the discrete distances for each drive voltage and obtaining an intersection of the approximate expression and a straight line of the distance threshold, the distance reference drive voltage can be obtained easily.

In this invention, it is preferred that the step of obtaining the size reference drive voltage is executed to determine to be the size reference drive voltage a voltage value corresponding to an intersection of an approximate expression which approximates the ink droplet sizes for each drive voltage and a straight line of the size threshold.

By obtaining an approximate expression which approximates the discrete ink droplet sizes for each drive voltage and obtaining an intersection of the approximate expression and a straight line of the size threshold, the size reference drive voltage can be obtained easily.

In this invention, it is preferred that the head includes a plurality of nozzles arranged in a direction perpendicular to a transport direction of the printing medium for dispensing the ink droplets, the nozzles being driven by one driver; and the luminance distribution is calculated by averaging, in the direction perpendicular to the transport direction of the printing medium, luminance of the testing charts formed by all the nozzles.

Where a plurality of nozzles are provided and these nozzles are drive by the same driver, correction can be made taking variations of each nozzle into account by obtaining a luminance distribution after averaging luminance of the testing charts printed by all the nozzles in the direction perpendicular to the transport direction.

In this invention, it is preferred that the step of obtaining distances is executed to analyze shapes of the main droplets and shapes of the satellite droplets from a two-dimensional distribution of luminance values obtained by taking the distribution of luminance values in the transport direction and in the direction perpendicular to the transport direction, and obtain the distances in the transport direction between the main droplets and the satellite droplets based on these shapes.

Since the distances between the main droplets and the satellite droplets are obtained based on the two-dimensional luminance distribution, the distances can be obtained with a lighter processing load than the extraction of characteristic points.

In another aspect of this invention, there is provided an inkjet printing apparatus which performs printing by dispensing ink droplets from a head to a printing medium. This apparatus comprises a head having nozzles which dispense the ink droplets, for performing printing by dispensing the ink droplets to the printing medium; a transporting device for transporting the printing medium in a transport direction, in a position spaced from and opposed to the head; a print controller for applying a reference voltage to the head to dispense the ink droplets, the print controller printing on the printing medium by shifting a drive voltage relative to the reference voltage in response to print data, and printing testing charts on the printing medium with the drive voltage shifted in predetermined steps relative to the reference voltage; an image scanning device for reading the testing charts printed by the print controller to acquire testing chart images for the respective testing charts; a distance reference voltage calculator for determining presence or absence of satellite droplets for each drive voltage, with regard to each testing chart image, based on a luminance distribution of main droplets and satellite droplets, obtaining distances between the main droplets and the satellite droplets for each drive voltage based on the luminance distribution, from the testing chart image for the drive voltage providing the satellite droplets, and obtaining a distance reference drive voltage as a drive voltage satisfying a distance threshold, from a relationship of the distances for each drive voltage and the distance threshold corresponding to such distances between the main droplets and the satellite droplets that are, in the image scanning device, short enough to regard each pair of the main droplets and the satellite droplets as one ink droplet; a size reference voltage calculator for obtaining ink droplet sizes for each drive voltage, with regard to each testing chart image, based on the luminance distribution of the main droplets and the satellite droplets, and obtaining a size reference drive voltage as a drive voltage satisfying a size threshold, from a relationship of the sizes for each drive voltage and the size threshold which is an area providing a specified density; and a comparing/correcting device for comparing the distance reference drive voltage and the size reference drive voltage, and making correction by adopting a larger one as the reference voltage.

According to this invention, the print controller dispenses ink droplets from the head while transporting the printing medium with the transporting device, and causes testing charts to be printed by shifting the drive voltage relative to the reference voltage. The distance reference voltage calculator determines presence or absence of satellite droplets for each different drive voltage, with regard to each testing chart image acquired by the image scanning device, based on a luminance distribution. Distances between the main droplets and the satellite droplets are obtained for each drive voltage from the testing chart for the drive voltage providing the satellite droplets. A distance reference drive voltage satisfying a distance threshold is obtained from a relationship of the distances for each drive voltage and the distance threshold. Further, the size reference voltage calculator obtains ink droplet sizes for each drive voltage, with regard to the testing chart for each different drive voltage, based on the luminance distribution. A size reference drive voltage satisfying a size threshold is obtained from a relationship of the sizes for each drive voltage and the size threshold. Then, the comparing/correcting device compares the distance reference drive voltage and the size reference drive voltage, and replaces the original reference voltage with the larger one. Since the distances of satellite droplets are obtained from characteristic points of the satellite droplets extracted based on the luminance distribution of the testing chart images, the accuracy of voltage correction can be improved even with a scanning device of relatively low resolution. Further, since the original reference voltage is replaced with the larger of the distance reference drive voltage and the size reference drive voltage, the reference voltage will become a drive voltage which satisfies both the distance threshold and size threshold. It is therefore possible to satisfy a specified density of ink droplets without lowering print quality.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 4 is a schematic view showing variations of the ink droplets occurring with shifting of a drive voltage;

DESCRIPTION OF THE PREFERRED EMBODIMENTS

An embodiment of this invention will be described in detail hereinafter with reference to the drawings.

Figure 1:
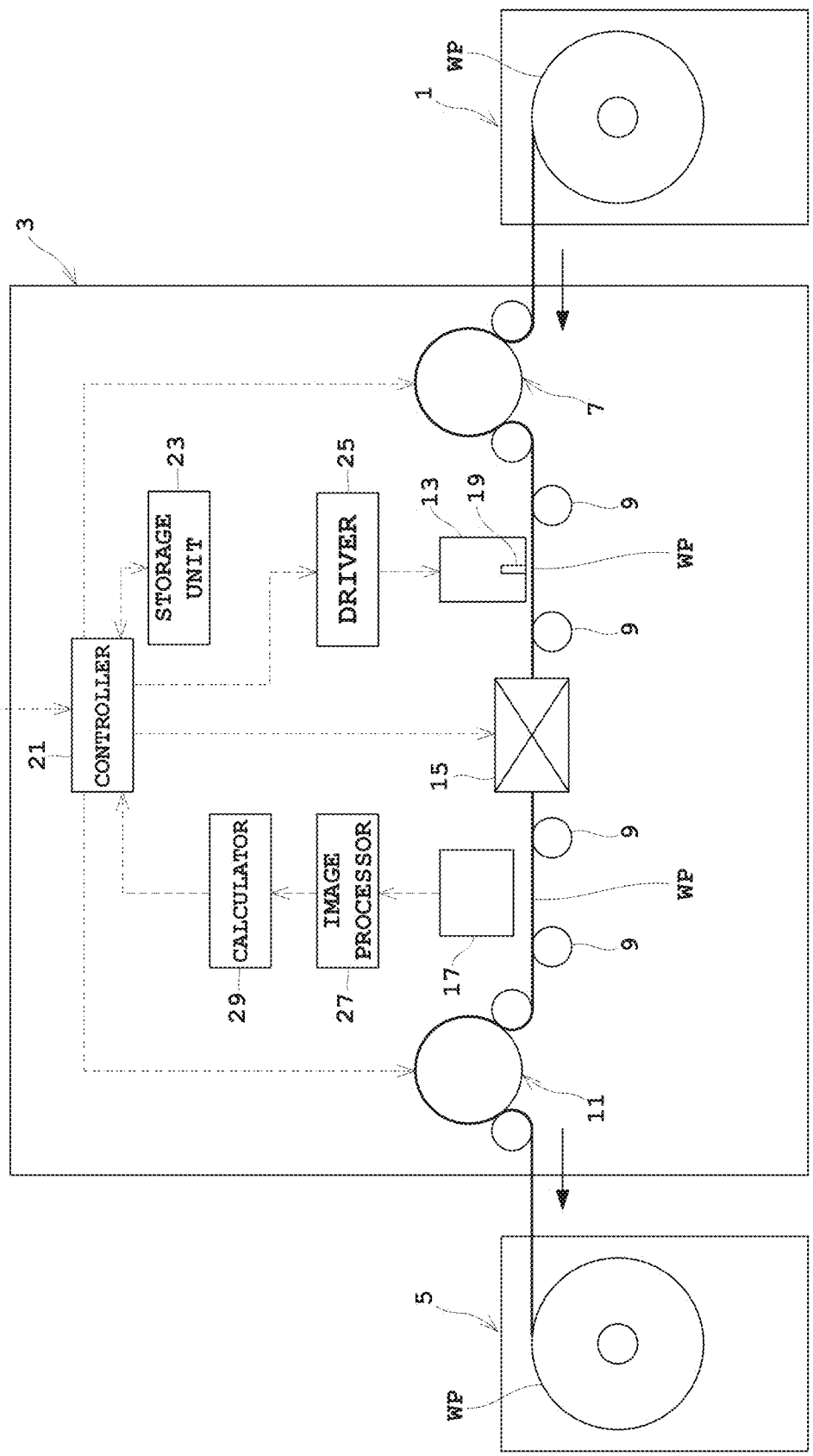
FIG. 1 is an outline schematic view showing an entire inkjet printing system according to an embodiment.
Figure 2:
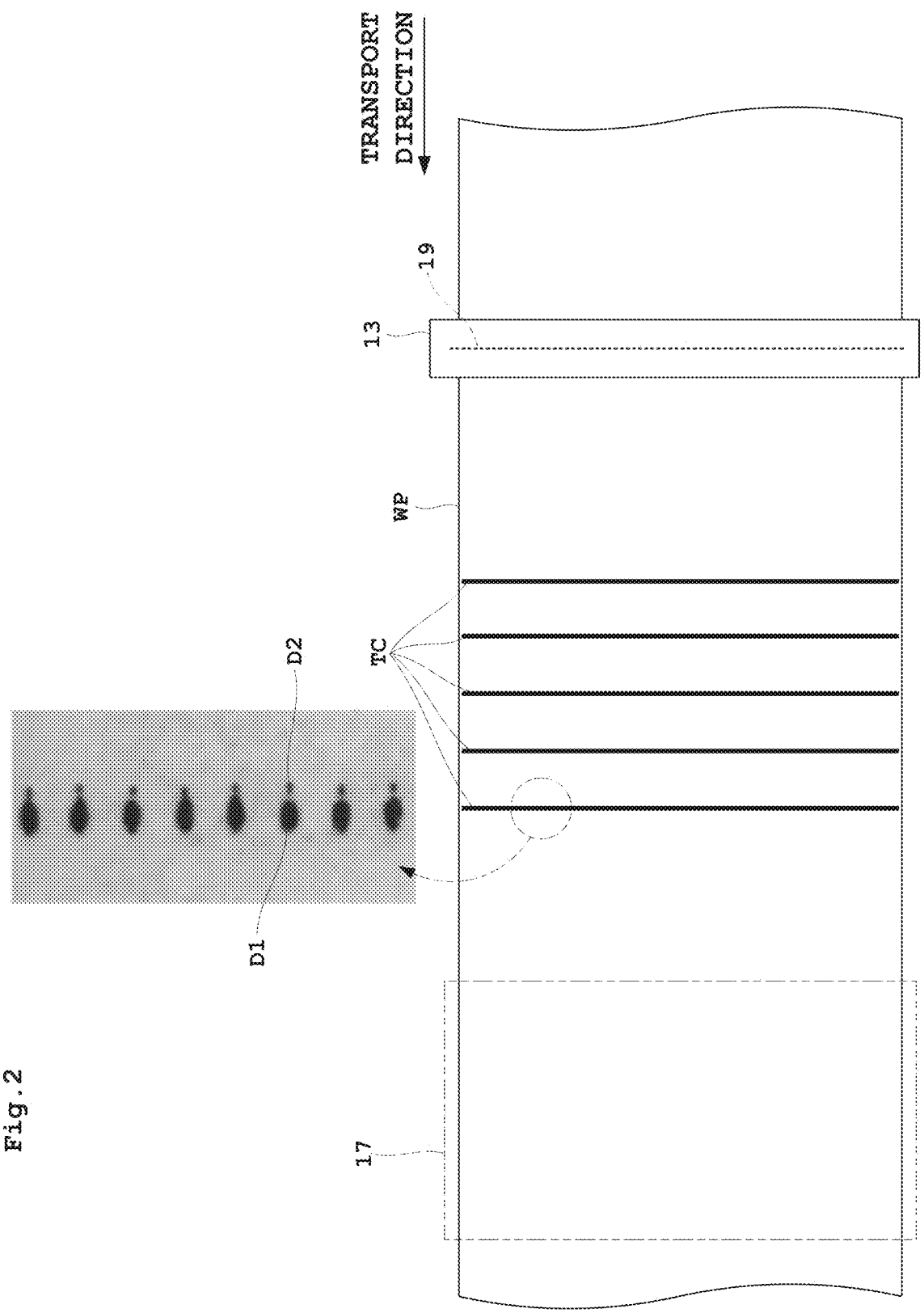
FIG. 2 is a plan view of a print head and web paper with testing charts printed thereon.

FIG. 1 is an outline schematic view showing an entire inkjet printing system according to the embodiment. FIG. 2 is a plan view of a print head and web paper with testing charts printed thereon.

The ink jet printing system according to this embodiment includes a paper feeder 1, an inkjet printing apparatus 3 and a takeup roller 5.

The paper feeder 1 holds web paper WP in a roll form to be rotatable about a horizontal axis, and unwinds and feeds the web paper WP to the inkjet printing apparatus 3. The inkjet printing apparatus 3 performs printing on the web paper WP. The takeup roller 5 takes up on a horizontal axis the web paper WP printed in the inkjet printing apparatus 3. Referring to the side of feeding the web paper WP as upstream and that of discharging the web paper WP as downstream, the paper feeder 1 is located upstream of the inkjet printing apparatus 3, and the takeup roller 5 downstream thereof.

The inkjet printing apparatus 3 includes a drive roller 7 disposed in an upstream position for taking in the web paper WP from the paper feeder 1. The web paper WP unwound from the paper feeder 1 by the drive roller 7 is transported downstream along a plurality of transport rollers 9 toward the takeup roller 5. A drive roller 11 is disposed between the most downstream transport roller 9 and the takeup roller 5. This drive roller 11 feeds the web paper WP transported on the transport rollers 9 forward toward the takeup roller 5.

The inkjet printing apparatus 3 has a printing unit 13, a dryer 15 and a scanning unit 17 arranged in the stated order from upstream between the drive roller 7 and drive roller 11. The dryer 15 dries portions printed by the printing unit 13. The scanning unit 17 acquires images for checking whether the printed portions have stains, omissions or other defects, and testing chart images for correcting a reference voltage which will be described hereinafter.

The printing unit 13 has a head 19 for dispensing ink droplets. It is common practice to provide a plurality of printing units 13 arranged along the transport direction of web paper WP. For example, four printing units 13 are provided separately for black (K), cyan (C), magenta (M), and yellow (Y). In this embodiment, however, description will be made assuming that only one printing unit 13 is provided, in order to facilitate understanding of the invention. The printing unit 13 includes one head 19 with a plurality of nozzles just to be capable of printing without moving over a printing area transversely of the web paper WP (i.e. perpendicular to the plane of the drawing). That is, the inkjet printing apparatus 3 in this embodiment performs printing on the web paper WP while feeding the web paper WP in an auxiliary scanning direction, with the head 19 maintained stationary, not moving for main scans in a direction perpendicular to the transport direction of the web paper WP. Such a construction is called one-pass machine. A construction in which the printing unit 13 includes one head 19 is described herein by way of example, but the printing unit 13 may include a plurality of heads 19.

The drive rollers 7 and 11, printing unit 13, dryer 15, and scanning unit 17 are controlled overall by a controller 21. The controller 21 includes a CPU, memory, and so on, and receives from outside print data including image information for printing on the web paper WP. The controller 21 carries out printing through the printing unit 13 by referring to a storage unit 23, and outputting a drive voltage according to the print data to a driver 25. At this time, the controller 21 controls drive speed of the drive rollers 7 and 11 according to printing speed and ink droplet dispensation rate of the printing unit 13. The driver 25 is provided as corresponding to the head 19 of the printing unit 13. In this embodiment, therefore, since the number of head 19 of the printing unit 13 is one, the number of driver 25 is one.

The storage unit 23 stores a reference voltage set in a unit-by-unit adjustment stage for the head 19 carried out before shipment of the apparatus, for example. The reference voltage herein is a drive voltage applied to the driver 25, when printing by the head 19, so that the density of ink droplets agree with a specified density level. As described in detail hereinafter, testing charts are printed with the head 19 attached to the printing unit 13 of the inkjet printing apparatus 1, and the reference voltage in the storage unit 23 is updated and corrected with drive voltages obtained from these testing charts.

The driver 25 operates the head 19 according to the drive voltage given from the controller 21. For example, the head 19 includes a plurality of piezoelectric elements, each piezoelectric element corresponds to each nozzle of the head 19 and is extendible and contractible in response to the level of the voltage applied, and the drive voltage is individually applied to each of the piezoelectric elements. The driver 25 is provided to form a pair with the head 19. Since there is one head 19 provided here, the number of driver 25 is also one.

The scanning unit 17 has built therein a scanner of relatively low resolution, for example. Its resolution is 1200 dpi, for example. The image data acquired by the scanning unit 17 is given to an image processor 27. In a voltage correction process described in detail hereinafter, testing charts read are acquired as testing chart images.

The image processor 27 carries out image processing for detecting defective portions of the images printed on the web paper WP at the time of product printing. At the time of head voltage correction process described hereinafter, the image processor 27 works on the testing chart images and carries out image processing necessary to determine distances between main droplet and satellite droplet among the ink droplets for each drive voltage, and to determine sizes of the ink droplets for each drive voltage.

A calculator 29, based on processing results of the image processor 27, determines presence or absence of satellite droplets, calculates the distances between main droplet and satellite droplet for each drive voltage, obtains an approximate expression for the distances, and determines a drive voltage (distance reference drive voltage) forming an intersection of the approximate expression and a straight line of a distance threshold. The calculator 29 also calculates the sizes of ink droplets for each drive voltage, obtains an approximate expression for the sizes, and determines a drive voltage (size reference drive voltage) forming an intersection of the approximate expression and a straight line of a size threshold. The distance threshold and the size threshold are stored beforehand in the calculator 29. The distance reference drive voltage and size reference drive voltage obtained are given to the controller 21.

The distance threshold herein refers to a maximum distance among the distances at each of which the main droplet and satellite droplet are close enough to each other to be regarded as one ink droplet when acquired by the scanning unit 17. In other words, it is a maximum distance at which the main droplet and satellite droplet are indistinguishable. In this embodiment, the distance threshold is set to a half diameter of the main droplet of an ink droplet size which satisfies the specified density, or to be more accurate, a half diameter of the main droplet in the transport direction. The size threshold herein refers to a size of ink droplet corresponding to the area of ink droplet providing a minimum density specified for the inkjet printing apparatus 1.

The controller 21 compares the distance reference drive voltage and the size reference drive voltage determined as described above. As a result, correction is made by replacing the reference voltage set beforehand with the higher of the two reference drive voltages.

The drive rollers 7 and 11 described above correspond to the "transporting device" in this invention. The controller 21 corresponds to the "print controller" in this invention. The scanning unit 17 corresponds to the "image scanning device" in this invention. The image processor 27 and calculator 29 described above correspond to the "distance reference voltage calculator" and "size reference drive voltage calculator" in this invention. The controller 21 corresponds to the "comparing/correcting device" in this invention.

FIG. 2 shows, by way of example, a testing chart TC used in the head voltage correction process. The illustrated testing chart TC is obtained by printing with the drive voltage of the head 19 shifted at predetermined steps relative to the reference voltage, for example. Specifically, the controller 21 reads the reference voltage from the storage unit 23, and applies to the driver 25 the reference voltage and drive voltages reduced at 2% steps relative to the reference voltage. That is, the testing charts TC are linear charts printed with drive voltage=reference voltage (0%), drive voltage=reference voltage−2%, drive voltage=reference voltage−4%, drive voltage=reference voltage−6%, and drive voltage=reference voltage−8%, respectively. As shown in the partly enlarged portion of FIG. 2, each of the linear charts is formed of dots for printing in any one size of small droplets, medium droplets and large droplets in the inkjet printing apparatus 1. While it is ideal that the droplets consist only of main droplets, satellite droplets D2 appear on upstream sides of the main droplets D1 since small ink droplets are dispensed following the main droplets.

Figure 3C:
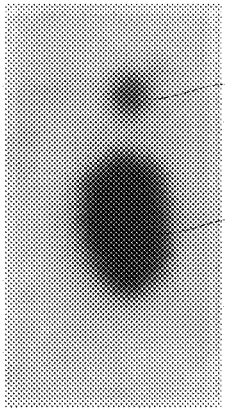
FIG. 3 is a graph showing luminance values after scanning of ink droplets.
Figure 3A:
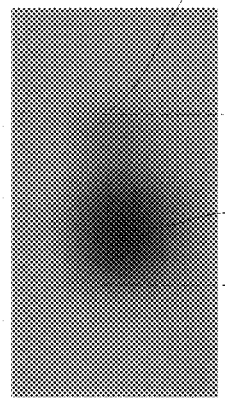
Figure 3B:
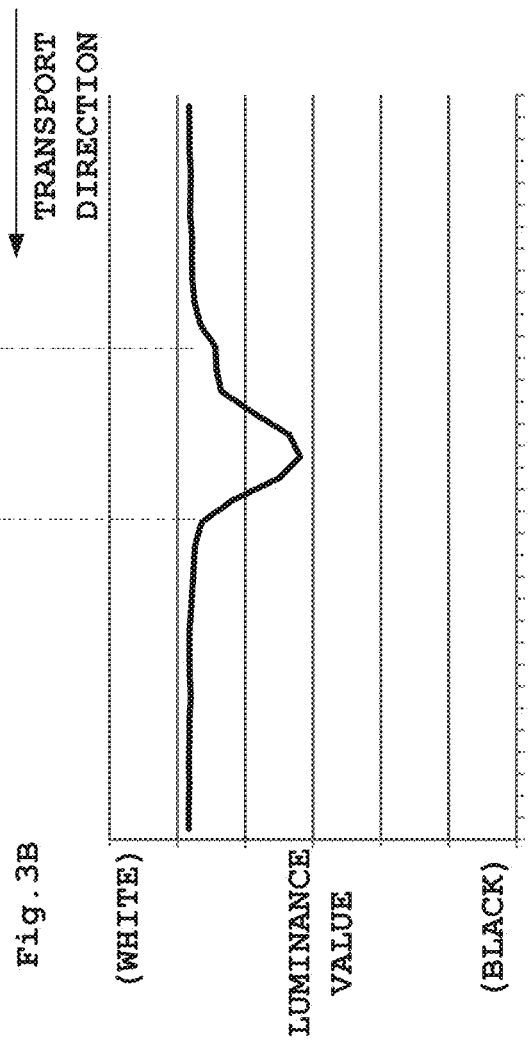

Reference is now made to FIGS. 3A-3C. FIGS. 3A-3C are graphs showing luminance values after scanning of ink droplets FIG. 3A shows an image, scanned by the scanning unit 17 of relatively low resolution, of ink droplets consisting of a main droplet D1 and a satellite droplet D2. FIG. 3B is a graph of luminance values resulting from the image of FIG. 3A. FIG. 3C shows an image, scanned by a scanning unit 17 of relatively high resolution, of ink droplets consisting of a main droplet D1 and a satellite droplet D2. A scanner of high resolution would render the main droplet D1 and satellite droplet D2 clearly distinguishable as in the image of FIG. 3C. It will be appreciated that, with the scanning unit 17 of low resolution specification in the apparatus in this embodiment, it is difficult clearly to distinguish between the main droplet D1 and satellite droplet D2 from the graph of luminance values reflecting the distance in the transport direction as in FIG. 3B.

Next, reference is made to FIGS. 4A-4D. FIGS. 4A-4D are schematic views showing variations of the ink droplets occurring with shifting of the drive voltage.

FIG. 4A shows ink droplets discharged by the reference voltage used as drive voltage. FIG. 4B shows ink droplets resulting from the drive voltage made reference voltage−2%. In FIG. 4C, the drive voltage is made reference voltage−4%. In FIG. 4D, the drive voltage is made reference voltage−6%. It will be seen from these schematic views that, when the drive voltage is reduced in stages, the distance between main droplet D1 and satellite droplet D2 becomes shorter, finally eliminating the satellite droplet D2, and thus realizing a dispensation of ink droplets optimal in print quality. However, when attention is directed to length in the transport direction, it is seen that the length of main droplet D1 gradually becomes smaller as $L_0 > L_{-2} > L_{-4} > L_{-6}$. From these facts, it will be appreciated that, when simply the ink droplets are made to eliminate the satellite droplet D2, or the ink droplets are made to shorten the distance between main droplet D1 and satellite droplet D2, with a view to print quality, the size of the ink droplets will become too small, which may results in a possibility of the density of ink droplets of the inkjet printing apparatus 1 failing to satisfy the specified density.

Figure 5:
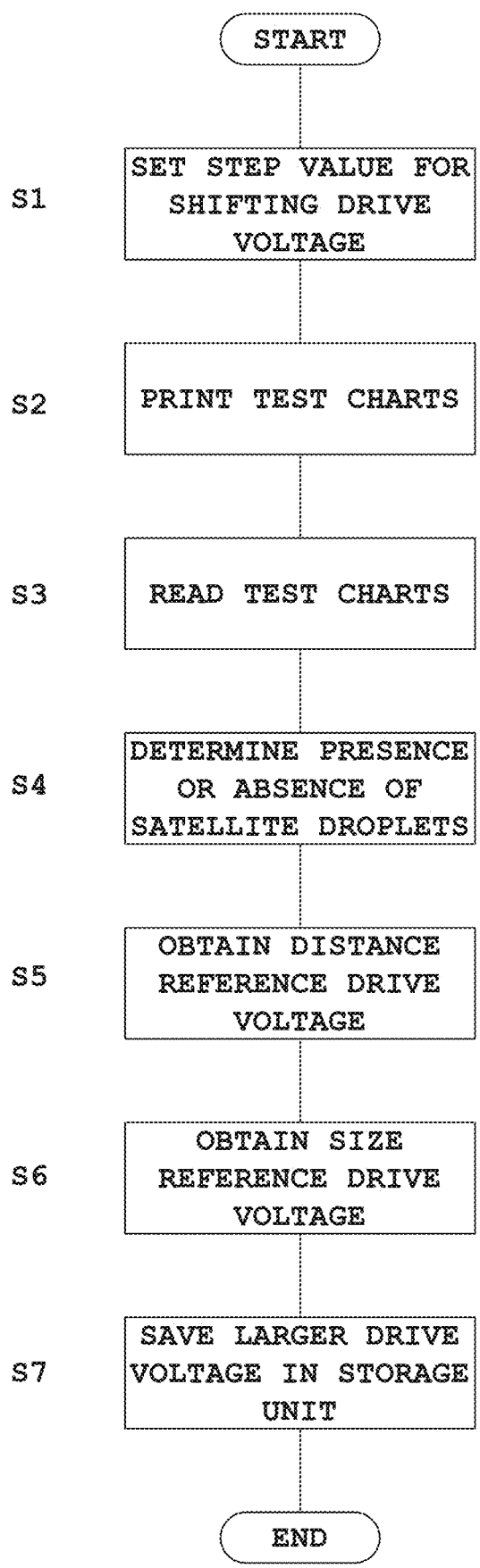
FIG. 5 is a flow chart showing a sequence of a head voltage correction process.
Figure 6:
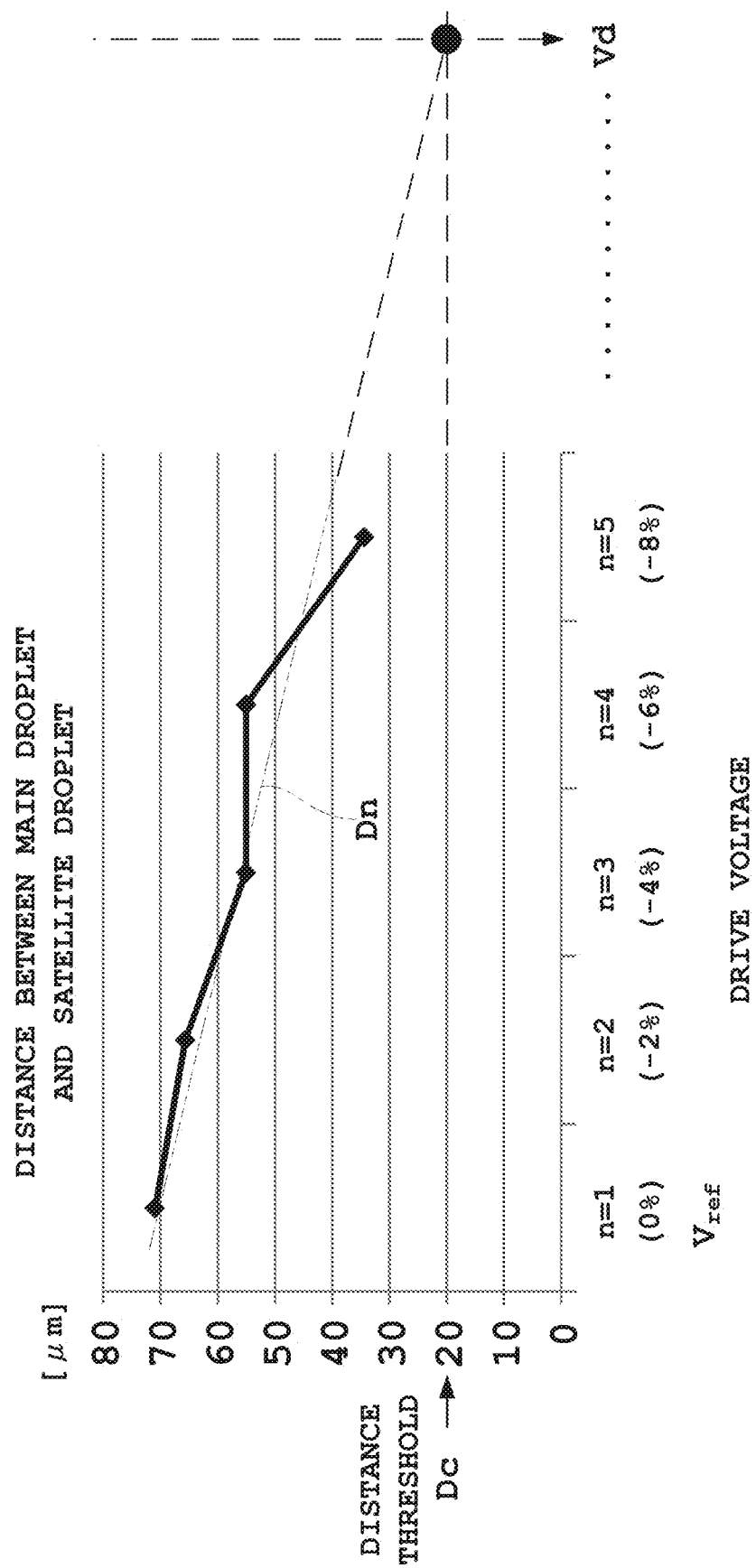
FIG. 6 is a graph showing a relationship between distance of satellite droplets from main droplets, and drive voltage.
Figure 7:
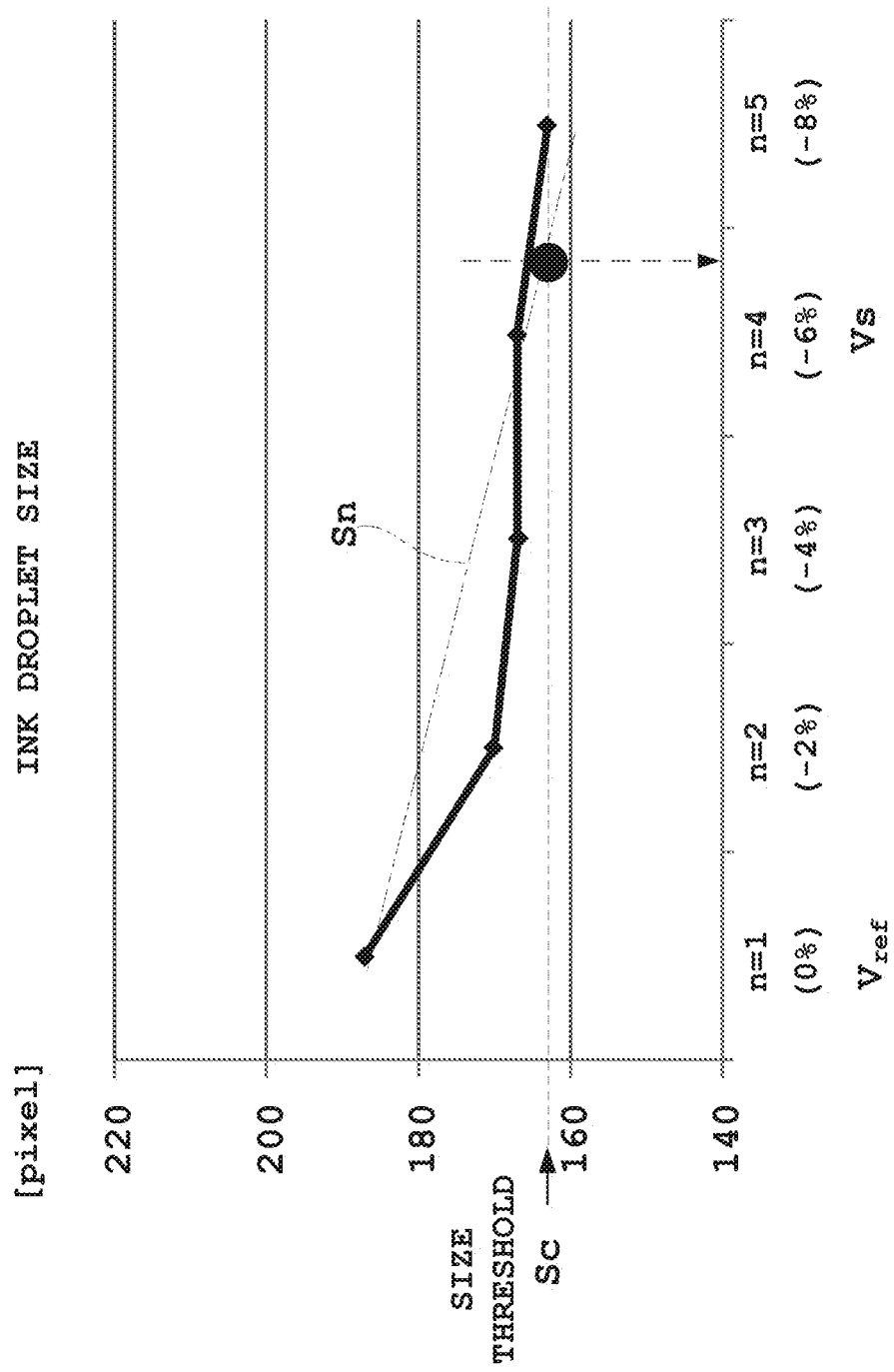
FIG. 7 is a graph showing a relationship between ink droplet size and drive voltage.

Next, the head voltage correction process will be described in detail with reference to FIGS. 5 through 7. FIG. 5 is a flow chart showing a sequence of the head voltage correction process. FIG. 6 is a graph showing a relationship between distance of satellite droplets from main droplets, and drive voltage. FIG. 7 is a graph showing a relationship between ink droplet size and drive voltage.

A setting unit not shown is operated by the operator to input beforehand a step value and the number of steps for shifting voltage relative to the reference voltage, which are stored in the storage unit 23. In this embodiment the above are assumed, respectively, to be a range of −2% and 5, for example. This shift range may be −1% or −3%, which may be set according to the characteristics of the head 19 or driver 25. Reference voltage $V_{ref}$ acquired at the time of adjustment of each head 19 is also stored beforehand in the storage unit 23.

Step S1

The controller 21 refers to the storage unit 23, and reads and sets the reference voltage $V_{ref}$, and the step value and the number of steps for shifting drive voltage.

Step S2

The controller 21 prints the testing charts described above on the web paper WP while giving the driver 25 drive voltages with the voltage shifted at the predetermined steps relative to the reference voltage $V_{ref}$. When, for example, the step value is −2% and the maximum of absolute values is −8%, five testing charts TC are printed through five printing steps n=1 to 5.

Step S3

The controller 21 operates the scanning unit 17 to read the testing charts TC and acquire testing chart images.

Step S4

The image processor 27 determines presence or absence of satellite droplets in each testing chart image based on luminance values using a technique described hereinafter, for example.

Step S5

The image processor 27 determines, from the testing chart images, distances between main droplets and satellite droplets of the ink droplets for each drive voltage. Assume, for example, that the distances for the respective drive voltages obtained from the testing chart images are plotted in relation to the drive voltages as shown in FIG. 6 (represented by the thick solid line in FIG. 6).

The calculator 29 calculates an approximate expression Dn (shown in a two-dot chain line in FIG. 6) from the relationship of the distances between the main droplets and satellite droplets with each of these drive voltages. The approximate expression can, for example, be formed by linear interpolation as Dn=an+b, where a is a gradient, b is a distance segment, and n is the number of steps. Since n=1 is reference voltage $V_{ref}$, the drive voltage Vd of an intersection, indicated by the black dot in FIG. 6, of the straight line of a distance threshold Dc set beforehand and the approximate expression Dn, when n=(Dc−b)/a, is given by equation (1) below. The calculator 29 calculates drive voltage Vd as distance reference drive voltage from this equation (1). The calculated distance reference drive voltage Vd is given to the controller 21.

$$Vd=V_{ref}+(n-1)\times-2\% \quad (1)$$

Step S6

The image processor 27 derives the sizes of ink droplets for each drive voltage from the testing chart image. Assume, for example, that the sizes for the respective drive voltages obtained from the testing chart images are plotted in relation to the drive voltages as shown in FIG. 7 (represented by the thick solid line in FIG. 7).

The calculator 29 calculates an approximate expression Sn (shown in a two-dot chain line in FIG. 7) from the relationship of the sizes with each of these drive voltages. The approximate expression can, for example, be formed by linear interpolation as Sn=cn+d, where c is a gradient, d is a size segment, and n is the number of steps. Since n=1 is reference voltage $V_{ref}$, the drive voltage Vs of an intersection, indicated by the black dot in FIG. 7, of the straight line of size threshold Sc set beforehand and the approximate expression Vs, when n=(Sc−d)/c, is given by equation (2) below. The calculator 29 calculates drive voltage Vs as size reference drive voltage from this equation (2). The calculated size reference drive voltage Vs is given to the controller 21.

$$Vs=V_{ref}+(n-1)\times-2\% \quad (2)$$

Step S7

The controller 21 compares distance reference drive voltage Vd and size reference drive voltage Vs, and adopts the larger drive voltage as new reference voltage. That is, the controller 21 saves the new reference voltage in the storage unit 23, and makes a correction by replacing the reference voltage stored beforehand with the new reference voltage.

Figure 8:
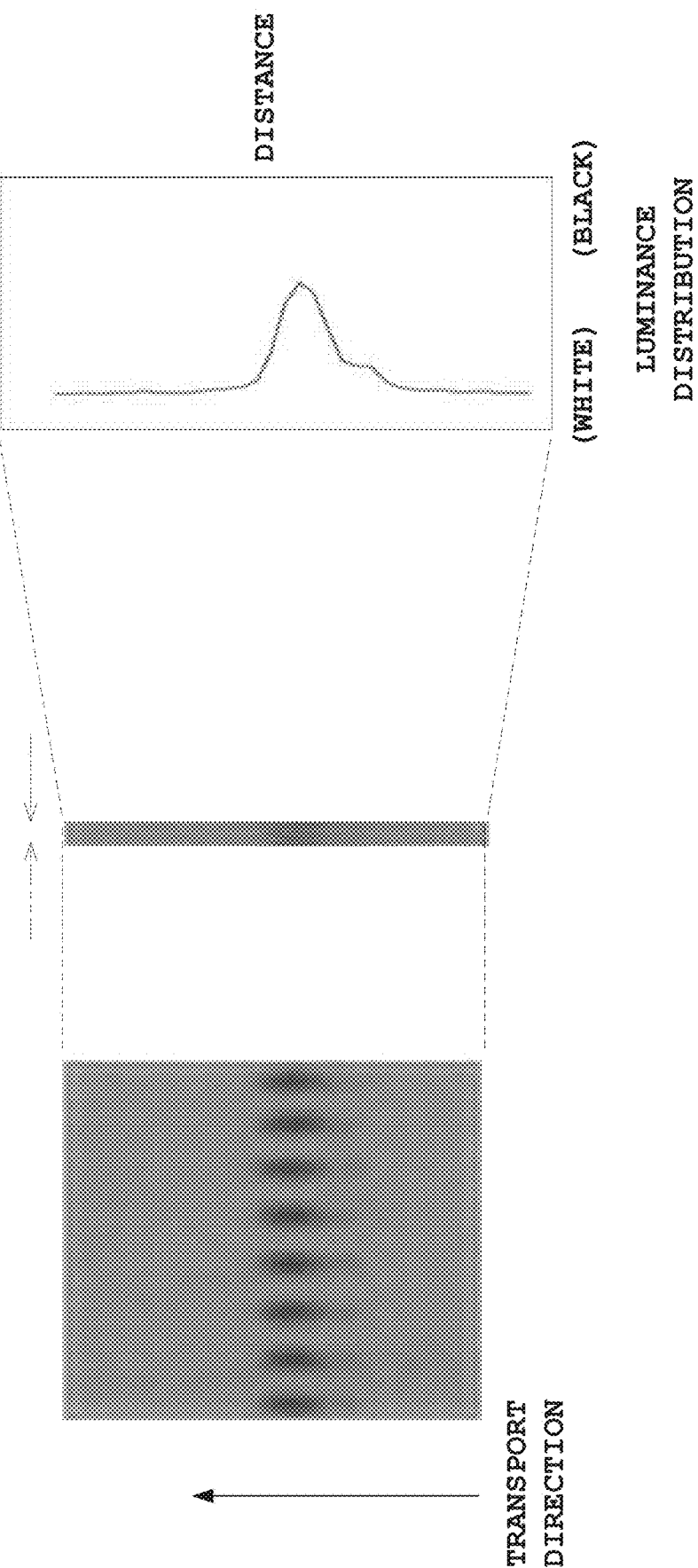
FIG. 8 is a view illustrating a process of averaging luminance values.
Figure 9:
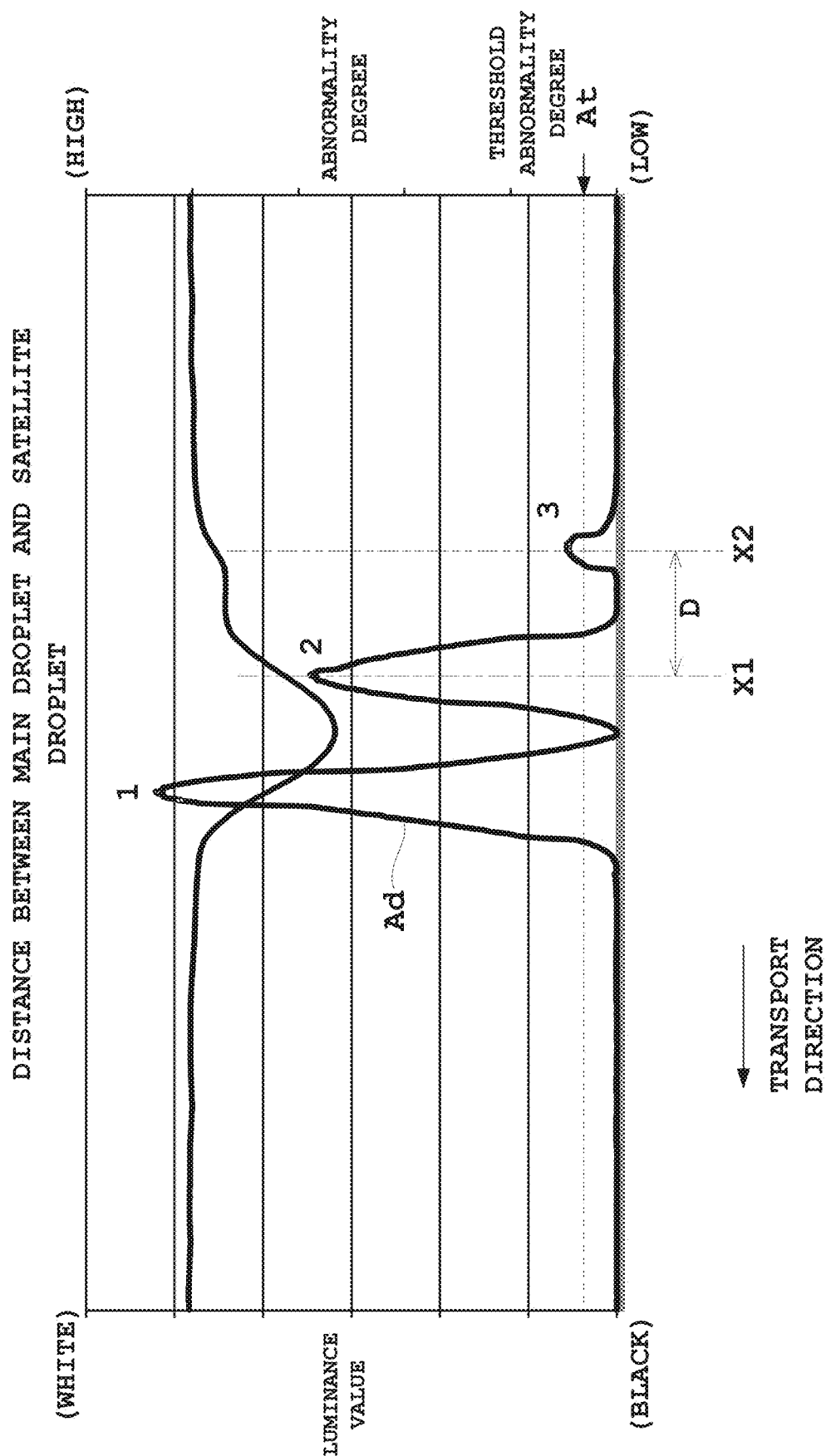
FIG. 9 is a graph showing a degree of abnormality in a luminance distribution of ink droplets.

Next, details of the step of determining presence or absence of satellite droplets and the step of obtaining distances between the main droplets and satellite droplet in the above head voltage correction process will be described with reference to FIGS. 8A-8C and 9. FIG. 8A-8C are views illustrating a process of averaging luminance values. FIG. 9 is a graph showing abnormality degrees in a luminance distribution of ink droplets.

In the above step S4, presence or absence of satellite droplets is determined. At the time of this determination, the image processor 27 first clips a plurality of locations from the testing chart images in a predetermined length perpendicular to the transport direction, each location including ink droplets corresponding to a predetermined number nozzles (the number of the nozzles of head 19) in the direction perpendicular to the transport direction (FIG. 8A). And the image processor 27 averages luminance values in the direction perpendicular to the transport direction for each clipped image (FIG. 8B). Subsequently, based on the averaged luminance values which are distributed corresponding to the distance in the transport direction, characteristic points of satellite droplets are extracted by a technique described hereinafter, for example, to determine presence or absence of satellite droplets. By carrying out an averaging process in this way, the head voltage can be appropriately corrected taking into account variations of each nozzle in the direction perpendicular to the transport direction.

In connection with the luminance distribution according to distance obtained in this way, it is preferable to smooth the luminance distribution through several times to several tens of times enlargement by bicubic method. This can improve the accuracy of calculation for variation points to be carried out subsequently, the accuracy of determination of presence or absence of satellite droplets, and the accuracy of distances between main droplet and satellite droplet.

The calculator 29 determines presence or absence of satellite droplets by obtaining variation points, that is a distribution of abnormality degrees from the distribution of luminance values for each distance. It is preferable to use AR model (autoregressive model) for this determination, for example. Specifically, when abnormality degree is Ad= (predicted value of luminance variation−actual measurement value of luminance)$^2$, and Y(t) is the luminance value of t-th pixel, the predicted value of luminance variation will be Y(t)=Y(t−1)×0.5+Y(t−2)×0.3+Y(t−3)×0.2.

The above abnormality degrees Ad derived from the distribution of luminance values will be as shown in FIG. 9, for example. Note that accuracy can be improved by using moving average in order to remove noise. By setting an abnormality degree threshold At at this time, the number of peaks in the abnormality degrees Ad higher than the abnormality degree threshold At can be calculated. When the number of peaks does not exceed two, determination will be made that there are no satellite droplets. When the number of peaks is three or more, determination will be made that there are satellite droplets. Thus, only by counting the number of variation points in the luminance value distribution, determination can easily be made that there are satellite droplets.

The calculator 29 calculates a distance between main droplet and satellite droplet from the positions of calculated peaks. Specifically, by obtaining distance D between the peaks of a second one X1 and a third one X2 of the variation points in order from downstream in the transport direction, the distance between main droplet and satellite droplet can be obtained almost accurately even with the scan unit 17 of relatively low resolution. When bicubic expansion is used in acquiring the distribution of luminance values, a conversion for the multiplying factor can also be made. When, for example, the resolution [dpi] of the scanning unit 17 is RESO, the bicubic multiplying factor is 40 times, and distance Dp [pxel] between main droplet and satellite droplet is X2+X1, distance D [μm] between main droplet and satellite droplet can be expressed by the following equation (3).

$$D=Dp/40/RESO\times 25.4\times 1000 \quad (3)$$

The distance between main droplet and satellite droplet may be obtained by a method different from the above method based the variation points in the distribution of luminance values. A method may be employed in which the shape of each of main droplet and satellite droplet is analyzed from a two-dimensional distribution of luminance values obtained by taking a distribution of luminance values not only in the transport direction, but taking a distribution of luminance values also in the direction perpendicular to the transport direction, the distance in the transport direction between main droplet and satellite droplet being obtained based on these shapes. According to this method, the distance can be obtained with a lighter processing load than the extraction of characteristic points.

In order to obtain the sizes of ink droplets described above, the image processor 27 may binarize the luminance distribution and regard their areas as the sizes of ink droplets. Apart from this, the image processor 27 may derive lengths in the transport direction and lengths in the direction perpendicular to the transport direction from the distribution of luminance values, determine diameters of the ink droplets, and regard these diameters as the sizes of the ink droplets. The sizes here may be anything relevant to the specified density of ink droplets, such as lengths or areas of the ink droplets.

According to this embodiment, the controller 21 discharges ink droplets from the head 19 while transporting the web paper WP, and shifts drive voltage relative to the reference voltage $V_{ref}$ to print the testing charts TC. With regard to the testing chart image for each different drive voltage acquired by the scanning unit 17, characteristic points of satellite droplets are extracted based on a luminance distribution to determine presence or absence of satellite droplets for each drive voltage. With regard to the testing charts TC for the drive voltage forming satellite droplets, the calculator 29 obtains distances between main droplet and satellite droplet for each drive voltage, and derives a drive voltage Vd satisfying the distance threshold Dc from a relationship between the distances for each drive voltage and the distance threshold Dc. Further, with regard to the testing chart image for each different drive voltage, the calculator 29 obtains sizes of the ink droplets for each drive voltage from the luminance distribution, and derives a drive voltage Vs satisfying the size threshold Sc from a relationship between the sizes of ink droplets for each drive voltage and the size threshold Sc. Then, the controller 21 compares drive voltage Vd and drive voltage Vs, and replaces the original reference voltage $V_{ref}$ with the larger one. Since the distances of satellite droplets are obtained from the characteristic points of the satellite droplets extracted based on the luminance distribution of the testing chart images, the accuracy of voltage correction can be improved even with the scanning unit 17 of relatively low resolution. Further, since the original reference voltage $V_{ref}$ is replaced with the larger of drive voltage Vd and drive voltage Vs, the reference voltage will become a drive voltage which satisfies both the distance threshold Dc and size threshold Sc. It is therefore possible to satisfy a specified density of ink droplets without lowering print quality.

This invention is not limited to the foregoing embodiment, but may be modified as follows:

(1) In the foregoing embodiment, the inkjet printing apparatus 3 employs web paper WP as printing medium. According to this invention, the printing medium is not limited to the web paper WP. For example, the printing medium may be in the form of separate sheets, and may be a plastic film medium instead of paper.

(2) The foregoing embodiment has been described exemplifying the printing unit 3 having one head 19, with one driver 25 provided for the one head 19. This invention is not limited to such construction. Where, for example, the printing unit 3 has a plurality of heads 19, with a driver 25 provided for each head 19, the above-described head voltage correction may be carried out for each driver 25. Where a plurality of printing units 3 are provided, the head voltage correction may be carried out for each head 19 of the printing units 3.

(3) In the foregoing embodiment, the inkjet printing apparatus 3 has the construction shown in FIG. 1. This invention is not limited to such construction.

This invention may be embodied in other specific forms without departing from the spirit or essential attributes thereof and, accordingly, reference should be made to the appended claims, rather than to the foregoing specification, as indicating the scope of the invention.

What is claimed is:

1. A head voltage correcting method for inkjet printing apparatus which perform printing by dispensing ink droplets from a head to a printing medium, the method comprising the steps of:
    printing a testing chart corresponding to each different drive voltage by applying, to the head, drive voltages shifted at predetermined steps from a reference voltage for dispensing the ink droplets with predetermined density;
    acquiring a testing chart image for each testing chart by reading the testing chart;
    determining presence or absence of satellite droplets for each drive voltage, with regard to each testing chart image, based on a luminance distribution of main droplets and satellite droplets;
    obtaining distances between the main droplets and the satellite droplets for each drive voltage based on the luminance distribution, from the testing chart image for the drive voltage providing the satellite droplets;
    obtaining a distance reference drive voltage as a drive voltage satisfying a distance threshold, from a relationship of the distances for each drive voltage and the distance threshold which is a maximum of such distances between the main droplets and the satellite droplets that are, in the acquiring step, short enough to regard each pair of the main droplets and the satellite droplets as one ink droplet;
    obtaining ink droplet sizes for each drive voltage, with regard to each testing chart image, based on the luminance distribution of the main droplets and the satellite droplets;
    obtaining a size reference drive voltage as a drive voltage satisfying a size threshold, from a relationship of the sizes for each drive voltage and the size threshold which is an area providing a specified density; and
    comparing the distance reference drive voltage and the size reference drive voltage, and making correction by adopting a larger one as the reference voltage.

2. The head voltage correcting method for inkjet printing apparatus according to claim 1, wherein:
    the step of determining presence or absence of satellite droplets is executed to determine presence or absence of satellite droplets, with regard to each test charge image, by extracting characteristic points of the satellite droplets based on the luminance distribution of the main droplets and the satellite droplets; and
    the step of obtaining distances is executed to obtain the distances between the main droplets and the satellite droplets for each drive voltage based on the characteristic points, from the testing chart image for the drive voltage providing the satellite droplets.

3. The head voltage correcting method for inkjet printing apparatus according to claim 2, wherein the step of determining presence or absence of satellite droplets is executed to obtain variation points in the luminance distribution of the testing chart image, and determine that satellite droplets are present when at least three variation points are found.

4. The head voltage correcting method for inkjet printing apparatus according to claim 3, wherein, when at least three variation points are found, a length between a second one and a third one of the variation points in order from downstream in a transport direction is determined to represent the distances.

5. The head voltage correcting method for inkjet printing apparatus according to claim 4, wherein the step of obtaining the distance reference drive voltage is executed to determine to be the distance reference drive voltage a voltage value corresponding to an intersection of an approximate expression which approximates the distances for each drive voltage and a straight line of the distance threshold.

6. The head voltage correcting method for inkjet printing apparatus according to claim 3, wherein the step of obtaining the distance reference drive voltage is executed to determine to be the distance reference drive voltage a voltage value corresponding to an intersection of an approximate expression which approximates the distances for each drive voltage and a straight line of the distance threshold.

7. The head voltage correcting method for inkjet printing apparatus according to claim 2, wherein the step of obtaining the distance reference drive voltage is executed to determine to be the distance reference drive voltage a voltage value corresponding to an intersection of an approximate expression which approximates the distances for each drive voltage and a straight line of the distance threshold.

8. The head voltage correcting method for inkjet printing apparatus according to claim 2, wherein the step of obtaining the size reference drive voltage is executed to determine to be the size reference drive voltage a voltage value corresponding to an intersection of an approximate expression which approximates the ink droplet sizes for each drive voltage and a straight line of the size threshold.

9. The head voltage correcting method for inkjet printing apparatus according to claim 1, wherein the step of determining presence or absence of satellite droplets is executed to obtain variation points in the luminance distribution of the testing chart image, and determine that satellite droplets are present when at least three variation points are found.

10. The head voltage correcting method for inkjet printing apparatus according to claim 9, wherein, when at least three variation points are found, a length between a second one and a third one of the variation points in order from downstream in a transport direction is determined to represent the distances.

11. The head voltage correcting method for inkjet printing apparatus according to claim 10, wherein the step of obtaining the distance reference drive voltage is executed to determine to be the distance reference drive voltage a voltage value corresponding to an intersection of an approximate expression which approximates the distances for each drive voltage and a straight line of the distance threshold.

12. The head voltage correcting method for inkjet printing apparatus according to claim 10, wherein the step of obtaining the size reference drive voltage is executed to determine to be the size reference drive voltage a voltage value corresponding to an intersection of an approximate expression which approximates the ink droplet sizes for each drive voltage and a straight line of the size threshold.

13. The head voltage correcting method for inkjet printing apparatus according to claim 9, wherein the step of obtaining the distance reference drive voltage is executed to determine to be the distance reference drive voltage a voltage value corresponding to an intersection of an approximate expression which approximates the distances for each drive voltage and a straight line of the distance threshold.

14. The head voltage correcting method for inkjet printing apparatus according to claim 9, wherein the step of obtaining the size reference drive voltage is executed to determine to be the size reference drive voltage a voltage value corresponding to an intersection of an approximate expression which approximates the ink droplet sizes for each drive voltage and a straight line of the size threshold.

15. The head voltage correcting method for inkjet printing apparatus according to claim 1, wherein the step of obtaining the distance reference drive voltage is executed to determine to be the distance reference drive voltage a voltage value corresponding to an intersection of an approximate expression which approximates the distances for each drive voltage and a straight line of the distance threshold.

16. The head voltage correcting method for inkjet printing apparatus according to claim 15, wherein the step of obtaining the size reference drive voltage is executed to determine to be the size reference drive voltage a voltage value corresponding to an intersection of an approximate expression which approximates the ink droplet sizes for each drive voltage and a straight line of the size threshold.

17. The head voltage correcting method for inkjet printing apparatus according to claim 15, wherein the step of obtaining distances is executed to analyze shapes of the main droplets and shapes of the satellite droplets from a two-dimensional distribution of luminance values obtained by taking the distribution of luminance values in the transport direction and in the direction perpendicular to the transport direction, and obtain the distances in the transport direction between the main droplets and the satellite droplets based on these shapes.

18. The head voltage correcting method for inkjet printing apparatus according to claim 1, wherein the step of obtaining the size reference drive voltage is executed to determine to be the size reference drive voltage a voltage value corresponding to an intersection of an approximate expression which approximates the ink droplet sizes for each drive voltage and a straight line of the size threshold.

19. The head voltage correcting method for inkjet printing apparatus according to claim 1, wherein:
- the head includes a plurality of nozzles arranged in a direction perpendicular to a transport direction of the printing medium for dispensing the ink droplets, the nozzles being driven by one driver; and
- the luminance distribution is calculated by averaging, in the direction perpendicular to the transport direction of the printing medium, luminance of the testing charts formed by all the nozzles.

\* \* \* \* \*